(12) United States Patent  
Amendola et al.

(10) Patent No.: US 10,128,543 B2
(45) Date of Patent: Nov. 13, 2018

(54) MOLTEN METAL RECHARGEABLE ELECTROCHEMICAL CELL

(71) Applicant: Eos Energy Storage, LLC, Edison, NJ (US)

(72) Inventors: Steven Amendola, Easton, PA (US); Stefanie Sharp-Goldman, East Brunswick, NJ (US)

(73) Assignee: Eos Energy Storage, LLC, Edison, NJ (US)

( * ) Notice: Subject to any disclaimer, the term of this patent is extended or adjusted under 35 U.S.C. 154(b) by 498 days.

(21) Appl. No.: 14/324,311

(22) Filed: Jul. 7, 2014

(65) Prior Publication Data

US 2015/0010792 A1 Jan. 8, 2015

Related U.S. Application Data

(60) Provisional application No. 61/843,464, filed on Jul. 8, 2013, provisional application No. 61/988,460, filed on May 5, 2014.

(51) Int. Cl.
| | |
|---|---|
| *H01M 10/39* | (2006.01) |
| *H01M 4/46* | (2006.01) |
| *H01M 4/38* | (2006.01) |
| *H01M 2/02* | (2006.01) |
| *H01M 2/10* | (2006.01) |

(Continued)

(52) U.S. Cl.
CPC ....... *H01M 10/399* (2013.01); *H01M 2/0252* (2013.01); *H01M 2/0257* (2013.01); *H01M 2/1088* (2013.01); *H01M 4/38* (2013.01); *H01M 4/463* (2013.01); *H01M 4/661* (2013.01); *H01M 4/663* (2013.01); *H01M 10/615* (2015.04);

(Continued)

(58) Field of Classification Search
None
See application file for complete search history.

(56) References Cited

U.S. PATENT DOCUMENTS

| 3,245,836 A | 4/1966 | Agruss et al. |
| 3,503,808 A | 3/1970 | Agruss et al. |

(Continued)

FOREIGN PATENT DOCUMENTS

WO 2014/124288 8/2014

OTHER PUBLICATIONS

Agruss, Dr. B. et al., "First Quarterly Technical Progress Report on Design and Development of a Liquid Metal Cell for the Period Jan. 1, 1962-Mar. 31, 1962", Allison EDR 2678, Apr. 15, 1962, complete document.

(Continued)

*Primary Examiner* — Sarah A. Slifka
*Assistant Examiner* — Haroon S. Sheikh
(74) *Attorney, Agent, or Firm* — Honigman Miller Schwartz and Cohn LLP; Andrew N. Weber; Jonathan P. O'Brien

(57) ABSTRACT

The present invention provides rechargeable electrochemical cells comprising a molten anode, a cathode, and a non-aqueous electrolyte salt, wherein the electrolyte salt is situated between the molten anode and the cathode during the operation of the electrochemical cell, and the molten anode comprises an aluminum material; also provided are batteries comprising a plurality of such rechargeable electrochemical cells and processes for manufacturing such rechargeable electrochemical cells.

36 Claims, 8 Drawing Sheets

(51) Int. Cl.
*H01M 4/66* (2006.01)
*H01M 10/615* (2014.01)

(52) U.S. Cl.
CPC .............. *H01M 2300/0048* (2013.01); *H01M 2300/0054* (2013.01)

(56) References Cited

U.S. PATENT DOCUMENTS

| | | | |
|---|---|---|---|
| 3,533,844 A | | 10/1970 | Klopp et al. |
| 3,833,421 A | * | 9/1974 | Rubischko .......... H01M 10/399 429/103 |
| 4,054,729 A | | 10/1977 | Isenberg |
| 4,214,956 A | * | 7/1980 | Bowman .................. C25C 3/24 205/377 |
| 4,239,606 A | | 12/1980 | Dawless et al. |
| 4,849,072 A | | 7/1989 | Bowman et al. |
| 5,294,306 A | | 3/1994 | Howard et al. |
| 2007/0193878 A1 | * | 8/2007 | Nguyen .................. C25C 3/18 204/243.1 |
| 2008/0044725 A1 | | 2/2008 | Sadoway et al. |
| 2011/0014505 A1 | | 1/2011 | Bradwell et al. |
| 2011/0151289 A1 | * | 6/2011 | Vallance ............. H01M 2/1646 429/50 |
| 2012/0104990 A1 | | 5/2012 | Boysen et al. |
| 2014/0272481 A1 | * | 9/2014 | Chung ................ H01M 10/399 429/50 |
| 2015/0325821 A1 | * | 11/2015 | Bradwell .............. H01M 2/024 429/101 |
| 2017/0149095 A1 | | 5/2017 | Amendola et al. |

OTHER PUBLICATIONS

Bradwell, David et al., "Technical and Economic Feasibility of a High-Temperature Self-Assembling Battery", Master Thesis, MIT, 2006, complete document.
Bradwell, David J. et al., "Magnesium-Antimony Liquid Metal Battery for Stationary Energy Storage", Journal of he American Chemical Society, vol. 134, 2012, pp. 1895-1897.
Cui, Baochen et al., "A low temperature iron molten air battery", Journal of Material Chemistry A, Royal Society of Chemistry, vol. 2, 2014, pp. 10577-10580.
Cui, Baochen et al., "Improved Cycle Iron Molten Air Battery Performance Using a Robust Fin Air Electrode", Journal of The Electrochemical Society, vol. 162, No. 2, 2017, pp. A88-A92.
Licht, Stuart et al., "Molten air—a new, highest energy class of rechargeable batteries", Energy & Environmental Science, RSC Publishing, vol. 6, 2013, pp. 3646-3657.
Liu, Shuzhi et al., "A novel rechargeable zinc-air battery with molten salt electrolyte", Journal of Power Sources, Elsevier, vol. 342, 2017, pp. 435-441.
Liu, Shuzhl et al., "Critical advances for the iron molten air battery: a new lowest temperature, rechargeable, ternary electrolyte domain", Journal of Material Chemistry A, Royal Society of Chemistry, vol. 3, 2015, pp. 21039-21043.

* cited by examiner

MOLTEN METAL RECHARGEABLE ELECTROCHEMICAL CELL

CROSS REFERENCE TO RELATED APPLICATION

This U.S. patent application claims the benefit of U.S. provisional application Ser. Nos. 61/843,464, filed on Jul. 8, 2013, and 61/988,460, filed on May 5, 2014. The entire contents of these patent applications are incorporated herein by reference in their entireties.

FIELD OF THE INVENTION

This invention generally relates to electrically rechargeable electrochemical cells and batteries; specifically, electrochemical cells and batteries that employ molten electrode materials.

BACKGROUND

There has been considerable recent interest in the subject of elevated temperature molten liquid metal batteries for stationary electrical storage. This low cost energy storage technology holds promise to safely store highly intermittent renewable energy sources such as solar and wind energy. This will help meet increasing global electricity demand while simultaneously reducing $CO_2$ greenhouse emissions. These rechargeable (secondary) batteries consist of an anode, a cathode, and a suitable electrolyte salt that provides ionic conduction between them.

In molten metal rechargeable electrochemical cells, the cathode, the anode, and the electrolyte salt are stacked in order of decreasing liquid densities and heated to a molten state. When each of these three components is molten, their differing densities cause them to naturally settle into three, separate, horizontal, self-segregating (self-assembling), non-miscible molten levels. In this density stratification arrangement, the lower density molten metal electrode floats on top; the higher density molten metal electrode sinks to the bottom, and the electrolyte salt, having an intermediate density, floats between the two molten metal electrodes. Since all active components are molten, electrochemical diffusion and ion transport reactions are enhanced. And, molten metal electrodes are not susceptible to mechanical failure that often accompanies solid electrodes in electrochemical cells. This generally leads to an extended cell cycle life. The fact that these electrodes are in their molten states also precludes the formation of dendrites.

Traditional molten metal rechargeable electrochemical cells are described with alkaline or alkaline earth metal (e.g. magnesium) used as the less dense anode metal and antimony, Sb, used as the more dense cathode metal. These elevated temperature Mg—Sb cells use a suitable, ionically conducting electrolyte salt. When these components are heated to a temperature of greater than or equal to their respective melting temperatures, stratification of each of these species occurs. The denser molten Sb cathode settles to the bottom, the molten salt electrolyte (MgCl$_2$—KCl—NaCl) rests in the middle, and the less dense molten Mg anode floats on top. Adjacent molten layers are immiscible in each other. During a cell discharge reaction, at the anode, Mg metal is oxidized to form an $Mg^{2+}$ cation that migrates through the molten salt electrolyte to the Sb cathode where it is reduced to form neutral Mg that alloys with the molten Sb. As Mg is incorporated into the bulk of the Sb cathode structure, it forms an Mg—Sb alloy and the value of the subscript x in the formed metal alloy Mg—Sb gradually increases. During electrochemical recharge, when electrical current flows into the cell, Mg is driven out of the Mg—Sb alloy, across the electrolyte, where it then forms the original Mg anode.

The overall cell voltage during discharge is due to the differences in chemical potential between the metal anode when it is in its pure metal state and when this anode is alloyed with the cathode metal.

These traditional molten electrode electrochemical cells suffer from a number of substantial technical drawbacks. For instance, the anode material, the cathode material, or both comprise materials, such as magnesium, that react violently with oxygen or air at elevated temperatures. Therefore, these cells require electrical heating elements and hermetically sealed housings that restrict air or oxygen from entering into the housing of the cell and reacting with the molten metals therein. In turn, this necessitates complicated and inefficient cell configurations that are required to form useful batteries. Moreover, technical problems (e.g., effective sealing and anti-corrosion measures) arise from the manufacture of cells that are airtight at elevated temperatures. Solutions to these technical problems add to system design complexity and increased cell construction costs. Traditional molten electrode cells are also limited by reduced performance characteristics. For example, many traditional molten cells generate undesirably low voltages (e.g., less than 1 V). And, in other traditional cells, the anode material, the cathode material, or both comprise environmentally harmful, toxic, or otherwise expensive metals.

SUMMARY OF THE INVENTION

Electrochemical cells and batteries of the present invention solve one or more of the problems, discussed above, inherent with traditional electrochemical cells.

The present invention provides electrochemical cells comprising molten electrode materials that are relatively inert to oxygen gas or air at elevated temperatures. In some embodiments, the electrochemical cell comprises a housing that is not hermetically sealed from the environment. And, in some embodiments, the molten electrode materials comprise abundant, inexpensive materials that are safe and environmentally benign.

In one aspect, the present invention provides an electrically rechargeable electrochemical cell comprising an anode material that comprises an aluminum material. The advantages of using an aluminum material in a molten electrochemical cell include reduced cost, high commercial availability, and relatively low chemical reactivity at elevated temperatures. The ability of anodes comprised of aluminum materials to be used in the presence of oxygen allows for the production of non-hermetically sealed electrochemical cells, cell stacks, and batteries. It also allows for the use of heaters that burn a combustible fluid to achieve or maintain cell operating temperatures.

In one embodiment, the present invention provides a rechargeable electrochemical cell comprising a molten metal anode, a cathode (e.g., molten or non-molten), and an electrolyte salt (e.g., a non-aqueous ionically conductive electrolyte salt), wherein the electrolyte salt is situated between the molten anode and the cathode during the operation of the electrochemical cell, and the molten anode comprises an aluminum material (e.g., elemental aluminum, aluminum alloy, an amalgamated aluminum, or any combinations thereof).

In another embodiment, the invention relates to a rechargeable battery comprising a plurality of electrochemical cells that are electrically connected, wherein each electrochemical cell comprises a molten anode, a cathode, and a molten, non-aqueous electrolyte salt, wherein the molten anode comprises elemental aluminum, an aluminum alloy, or an amalgamated aluminum. In one embodiment, the cells may be stacked in a bipolar configuration.

In another embodiment, the invention relates to a process for manufacturing an electrically rechargeable electrochemical cell comprising heating an anode material to a molten state, wherein the molten anode material comprises aluminum; providing a cathode material; and providing an electrolyte salt situated between the anode material and the cathode material, wherein the molten anode material has a density that is less than the density of the cathode material.

Figure 1:
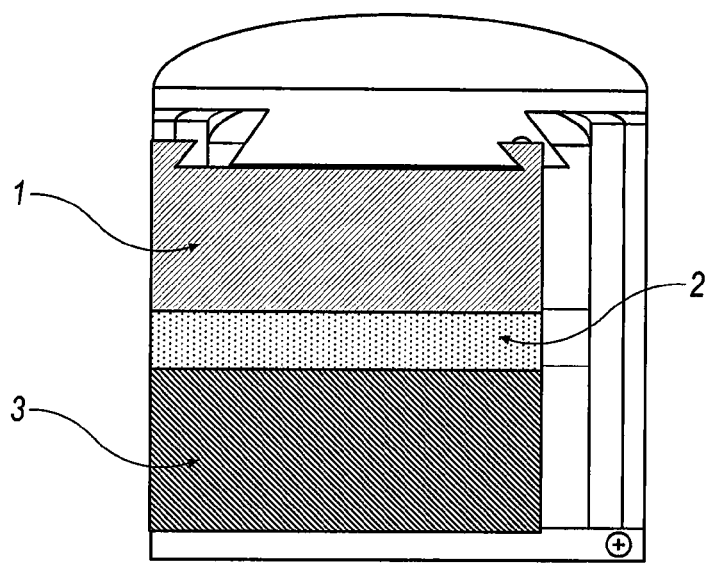
FIG. 1 is an illustration of an electrochemical cell of the present invention with (1) a lower density molten anode, (2) an intermediate density electrolyte salt, and (3) a higher density cathode.
Figure 2:
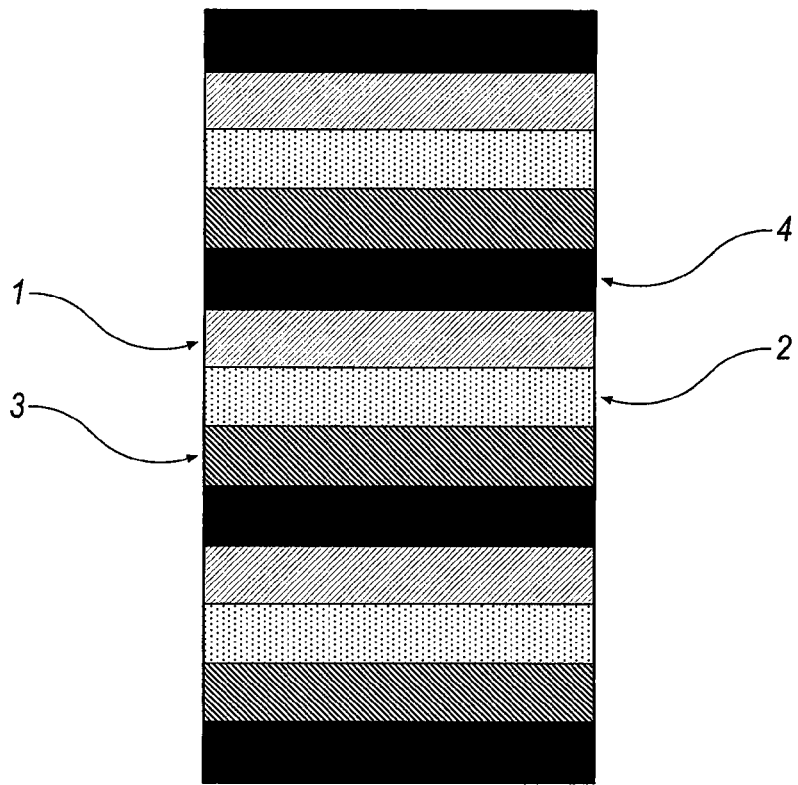
FIG. 2 is an illustration of a bipolar configuration of three cells according to the present invention with (1) lower density molten anodes, (2) intermediate density electrolyte salts, (3) higher density cathodes, and (4) bipolar electrodes.

These Figures are provided by way of example and are not intended to limit the scope of the invention.

DETAILED DESCRIPTION

The present invention provides an electrochemical cell comprising an anode and a cathode, wherein the anode, the cathode, or both is in a molten state, and an electrolyte salt situated between the electrode materials.

I. DEFINITIONS

As used herein, the term "battery" encompasses electrical storage devices comprising one electrochemical cell or a plurality of electrochemical cells. A "secondary battery" is electrically rechargeable, whereas a "primary battery" is not electrically rechargeable. For secondary batteries of the present invention, a battery cathode is designated as the positive electrode during battery discharge and the negative electrode during battery charging. Accordingly, the anode is designated as the negative electrode during cell discharge, and as the positive electrode during cell charge.

As used herein, the terms "electrochemical cell" and "cell" are used interchangeably.

As used herein, the term "molten" refers to a material that has been heated to a fluid (e.g., liquid) state.

As used herein, the term "aluminum" or "aluminum material" refers to elemental aluminum or aluminum alloys.

As used herein, the term "aluminum alloy" refers to a homogeneous mixture of elemental aluminum with one or more additional alloying metals. Examples of possible alloying metals include but are not limited to iron, silicon, gallium, bismuth, cadmium, scandium, indium, lead, mercury, thallium, tin, zinc, lithium, magnesium, antimony, copper, manganese, nickel, chromium, vanadium, titanium, zirconium, or any combination thereof.

As used herein, the term "operating temperature" refers to the average temperature of the materials inside the electrochemical cell when the cell is capable of discharging electrical current, or the cell is being recharged with electrical current.

As used herein, the term "eutectic amount" or "eutectic amounts" refers to the amount of a material or materials that, when mixed with another material, reduces the melting point of the mixture to a lower temperature than any other composition consisting of the same materials.

As used herein, the term "alloy" or "alloyed" refers to the combination of two or more metals for form a substantially homogenous metallic material.

As used herein, the term "non-aluminum alloying material" refers to any material that is substantially free of aluminum, and may be combined with aluminum to form an alloy.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. "Anode" and "anode material" are used interchangeably herein.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metal oxides, metal sulfides, layered compounds, zinc-metal phosphates, zinc-metal oxides, or any combination thereof. "Cathode" and "cathode material" are used interchangeably herein.

As used herein, an "electrolyte salt" or "electrolyte" refers to a substance that behaves as an electrically conductive medium. For example, the electrolyte facilitates the mobilization of electrons and cations (e.g., divalent or trivalent cations) in the cell.

As used herein, the term "oxide" applied to secondary batteries and secondary battery electrodes encompasses corresponding "hydroxide" species, which are typically present, at least under some conditions.

As used herein, the term "metal oxide" includes compounds that include at least one metal atom and at least one oxygen atom. 'Metal oxides' include "mixed metal oxides", wherein the metal oxide comprises at least two metal atoms of different elements and at least one oxygen atom.

As used herein, the term "metal sulfide" includes compounds that include at least one metal atom and at least one sulfur atom. 'Metal sulfides' include "mixed metal sulfides", wherein the metal sulfide comprises at least two metal atoms of different elements and at least one sulfur atom.

As used herein, the term "dopant" refers to a substance added to a material to alter its electrical properties. A "doped" material is a material to which a 'dopant' has been applied.

As used herein, the term "manganese oxide" refers to any manganese compound that includes one or more oxygen atoms in its coordination sphere. Examples of manganese oxide include $MnO$, $MnO_2$, $Mn_2O_3$, $Mn_3O_4$, $Mn(OH)_2$, $Mn(OH)_4$, $MnO_2(OH)_2$, $Mn(OH)_3$, $MnOOH$, $Mn(ONa)_2$, $Mn(OK)_2$, $Mn(OLi)_2$, $Mn(ORb)_2$, $MnOONa$, $MnOOK$, $MnOOLi$, $MnOORb$, $ZnFeMnO_2$, $(MnFe)_2O_3$, $NiMnO_4$, any hydrate thereof, or any combination thereof. In other examples, manganese oxide has the chemical formula $Mn_xO_y$, wherein x is greater than or equal to 1, and y is greater than or equal to 2. Some examples of manganese oxide have the chemical formula of $MnO_2$, $Mn_5O_8$, $Mn_3O_7 \cdot 3H_2O$, $Mn_7O_{14} \cdot 3H_2O$, $Mn_4O_9 \cdot 3H_2O$, $Mn_2O_4$, $Mn_4O_{18} \cdot H_2O$, or any combination thereof. In other examples, the manganese oxide has a predominate crystal structure of $\alpha$-$MnO_2$, $\beta$-$MnO_2$, $\gamma$-$MnO_2$, $\delta$-$MnO_2$, layered, or any combination thereof. Note that 'hydrates' of manganese include hydroxides of manganese. The term 'manganese oxide' also includes any of the abovementioned species that are doped and/or coated with dopants and/or coatings that enhance one or more properties of the manganese.

As used herein, "vanadium oxide" refers to any vanadium compound having at least one oxygen atom in its coordination sphere. 'Vanadium oxide' includes oxides or hydroxide of vanadium, e.g., $VO$, $VO_2$, $V_2O_3$, $V_2O_5$, $V_3O_7$, $V_4O_9$, $V_6O_{13}$, $V_4O_7$, $V_5O_9$, $V_6O_{11}$, $V_7O_{13}$, $V_8O_{15}$, or any combination thereof.

As used herein, the term "binary melt" refers to a substantially homogeneous mixture of two materials in a molten state.

As used herein, the term "ternary melt" refers to a substantially homogeneous mixture of three materials in a molten state.

As used herein, the term "hermetic seal" refers to a boundary impermeable to air.

As used herein, the term "bipolar configuration" or "bipolar assembly" refers to identical individual cells placed next to each other in a sandwich-like stack assembly where two adjacent cells share a common, thin, electrically conductive plate electrode. In this compact, duplex-type electrode configuration, two or more series-coupled electrochemical cells are arranged in such a way that one side of the common, electrically conducting electrode plate is the negative anode of one cell and the other side of this common, electrically conducting electrode is the positive cathode of the adjacent cell.

As used herein, the terms "first" and/or "second" do not refer to order or denote relative positions in space or time, but these terms are used to distinguish between two different elements or components. For example, a first component does not necessarily proceed a second component in time or space; however, the first component is not the second component and vice versa. Although it is possible for a first component to precede a second component in space or time, it is equally possible that a second component precedes a first component in space or time.

II. ELECTROCHEMICAL CELLS

The electrochemical cell of the present inventions comprise a molten anode, a cathode, and a non-aqueous electrolyte salt, wherein the electrolyte salt is situated between the molten anode and the cathode during the operation of the electrochemical cell, and the molten anode comprises an aluminum material.

In some embodiments, the anode material possesses a density that is lower than the density of the cathode material at the operating temperature of the cell. In other embodiments, the electrolyte salt possesses a density that is greater than the density of the anode material at the operating temperature of the cell. And, in other embodiments, the cathode material possesses a density that is greater than the density of the electrolyte salt at the operating temperature of the cell.

In some embodiments, the anode to forms a low density layer at the operating temperature of the cell, the cathode forms a high density layer at the operating temperature of the cell, and the electrolyte salt forms an intermediate density layer that is greater than the density of the anode and less than the density of the cathode at the operating temperature of the cell.

In some embodiments, the anode material comprises a molten aluminum material. In other embodiments, the cathode and the electrolyte salt are molten at the operating temperature of the cell.

In other embodiments, the anode material possesses a density of about 6 $g/cm^3$ or less. In some embodiments, the cathode material possesses a density greater than about 6 $g/cm^3$.

Electrolyte salts useful for the present invention mediate the mobilization of electrons and/or cations when the salt is molten. Additionally, in its molten state, the density of the electrolyte salt should be intermediate between that of the metal anode and metal cathode. This permits the electrolyte salt to self-situate between the anode and cathode.

To better illustrate the relationship between the density (when molten) of the metal anode, metal cathode, and electrolyte salt, Table 1 below lists densities of various metals when in their molten state.

TABLE 1

Densities of Various Metals at ~700° C.

| Material | Density | Suitability as Anode or Cathode |
| --- | --- | --- |
| Magnesium (Mg) | ~1.5 $g/cm^3$ | Anode |
| Aluminum (Al) | ~2.5 $g/cm^3$ | Anode |
| Barium (Ba) | ~3.5 $g/cm^3$ | Anode |
| Antimony (Sb) | ~6.5 $g/cm^3$ | Anode or Cathode |
| Zinc (Zn) | ~6.5 $g/cm^3$ | Anode or Cathode |
| Tin (Sn) | ~7 $g/cm^3$ | Cathode |
| Cadmium (Cd) | ~8 $g/cm^3$ | Cathode |
| Bismuth (Bi) | ~10 $g/cm^3$ | Cathode |
| Lead (Pb) | ~10.5 $g/cm^3$ | Cathode |

The operating temperature is another consideration for the electrochemical cell. By using operating temperatures in the electrochemical cell that are above the melting point of the anode, the anode will exist in a molten state. In some cases, operating temperatures greater than 500° C., greater than 650° C., or greater than 700° C. can be used. For example, the operating temperature is greater than 800° C.

Another aspect of the present invention provides a rechargeable electrochemical cell comprising a molten anode comprising an aluminum material; a cathode comprising a bismuth material, a tungsten material, or any combination thereof; and a non-aqueous electrolyte salt, wherein the electrolyte salt is situated between the molten anode and the cathode during the operation of the electrochemical cell, and the molten anode comprises an aluminum material.

A. Anode

Anodes that are useful in the electrochemical cell of the present invention possess one or more of the following properties when molten:

1) density when molten is lower than that of the cathode;
2) density when molten is lower than that of the electrolyte salt;
3) readily alloys with the cathode material at cell operating temperature;
4) non-flammable in the presence of air or moisture at cell operating temperature;
5) non-reactive with air or moisture at cell operating temperature;
6) low cost and readily available in multi-ton quantities;
7) have little or no reaction with the cell housing or cell sealing materials; and
8) should be molten at approximately the same temperature as the electrolyte.

In some embodiments, the anode comprises an aluminum material, where the aluminum material comprises elemental aluminum or an aluminum alloy. In some embodiments, the aluminum material has a reduced chemical reactivity at elevated temperatures. For instance, the aluminum material is less reactive with oxygen than elemental magnesium at elevated temperatures.

In another embodiment, the aluminum material forms a protective, self-limiting, aluminum oxide (e.g., $Al_2O_3$) layer in the presence of air. This oxide skin protects underlying molten aluminum from further oxidation and gives molten aluminum added stability. Thus, electrochemical cells comprising molten aluminum materials need not be hermetically sealed.

In another embodiment, aluminum material has lower vapor pressure than magnesium.

A comparison of vapor pressures for aluminum and magnesium is shown in Table 2 below.

TABLE 2

Comparison of Vapor Pressures for Al and Mg.

| | Vapor Pressure |
|---|---|
| Mg | 361 Pa (at 649° C.) |
| Al | $2.4 \times 10^{-6}$ Pa (at 660° C.) |

In some embodiments, the anode comprises an aluminum material and a molten salt electrolyte comprising aluminum halide and an alkali metal halide.

In some embodiments, the aluminum material does not substantially erode SiN at about 800° C. In some of these embodiments, the housing of the electrochemical cell comprises SiN.

In some embodiments the aluminum material is elemental aluminum.

In some embodiments, the aluminum material comprises an aluminum alloy, and the aluminum alloy comprises aluminum alloyed with iron, silicon, gallium, bismuth, cadmium, scandium, indium, lead, mercury, thallium, tin, zinc, lithium, magnesium, antimony, copper, manganese, nickel, chromium, vanadium, titanium, zirconium, or any combination thereof.

In some embodiments, the aluminum alloy comprises aluminum alloyed with a eutectic amount of iron, silicon, gallium, bismuth, cadmium, scandium, indium, lead, mercury, thallium, tin, zinc, lithium, magnesium, antimony, copper, manganese, nickel, chromium, vanadium, titanium, zirconium, or any combination thereof.

In some embodiments, the aluminum alloy comprises aluminum alloyed with iron, silicon, gallium, lithium, or any combination thereof.

In other embodiments, the aluminum alloy comprises aluminum alloyed with a eutectic amount of iron, silicon, gallium, lithium, or any combination thereof.

In some embodiments, the aluminum alloy may comprise from about 0.01 to about 50 wt % of a non-aluminum alloying material. The aluminum alloy may comprise from about 0.01 to about 5 wt % of a non-aluminum alloying material, from about 5 to about 25 wt % of a non-aluminum alloying material, or from about 25 to about 50 wt % of a non-aluminum alloying material.

B. Cathode

Cathodes and cathode materials useful in electrochemical cells of the present invention possess one or more of the following properties:

1) density at the operating temperature of the cell is greater than that of the anode;
2) density at the operating temperature of the cell is greater than that of the electrolyte salt;
3) easily forms stable alloys with the anode material at the operating temperature of the cell;
4) non-flammable in the presence of air or moisture at cell operating temperature;
5) non-reactive with air at cell operating temperature; and
6) have little or no reaction with the cell container or cell components at cell operating temperature.

When using aluminum as the anode metal, one of the factors influencing the choice of suitable cathode metals will depend on its ability to form an alloy with Al in its molten state. The choice of suitable metals for a molten cathode in this system depends on its melting point, density, stability, and electrochemical potential. Aluminum forms alloys with a number of metals including iron, copper, chromium, vanadium, titanium, bismuth, gallium, lead, zirconium, magnesium, manganese, silicon, antimony, tin, and zinc, any one of which or any combination of which may be used as a cathode in cells of the present invention.

In some embodiments, the cathode comprises a non-metallic material. In other embodiments, the cathode is not molten at the temperatures at which the cell operates.

In some embodiments, the cathode material comprises an elemental metal, metal alloy, metal oxide, metal sulfide, or doped material.

In some embodiments, the cathode comprises a cathode material that has a melting temperature that is less than or equal to the melting temperature of the anode.

In other embodiments, the cathode comprises a cathode material that has a melting temperature that is greater than or equal to the melting temperature of the anode.

In some embodiments, the cathode material is molten during the operation of the electrochemical cell.

In further embodiments, the cathode comprises iron, copper, chromium, vanadium, titanium, bismuth, gallium, lead, zirconium, magnesium, manganese, silicon, antimony, tin, zinc, or any combination thereof.

In specific embodiments, the cathode comprises elemental tin.

In other embodiments, the cathode comprises a bismuth material. In some instances, the bismuth material comprises bismuth and tin. For example, the cathode comprises from about 40 wt % to about 60 wt % of tin and from about 40 wt % to about 60 wt % of bismuth. And, in some examples, the cathode comprises about 50 wt % of tin and about 50 wt % of bismuth.

In some embodiments, the cathode material is substantially solid during the operation of the electrochemical cell.

In other embodiments, the cathode comprises one or more metal sulfides. For example, the cathode comprises $FeS_2$.

In some embodiments the cathode comprises manganese oxide, vanadium oxide, titanium aluminum tetrachloride, manganese chlorine aluminum tetrachloride, cobalt aluminum tetrachloride, or any combination thereof.

In some specific embodiments, the cathode comprises $Mn_2O_4$, $Ti(AlCl_4)_2$, $MnCl(AlCl_4)$, $Co(AlCl_4)_2$, $V_2O_5$, or any combination thereof.

In some specific embodiments, the cathode comprises a tungsten material. For example, the cathode comprises tungsten oxide (e.g., $WO_3$).

In some preferred embodiments, the cathode is capable of forming an alloy with the molten anode when cathode is also in a molten state. In a specific embodiment, the cathode is capable of forming an alloy with molten aluminum when the cathode material is also in a molten state.

C. Electrolyte Salt

Electrolyte salts useful in the electrochemical cells of the present invention possess one or more of the following properties in its molten state:
1) its density at the cell operating temperature is lower than that of the cathode and greater than that of the anode;
2) low cost;
3) have a melting point in the range where both the anode and cathode melt;
4) non reactivity with both molten metal anode and cathode;
5) be an excellent ionic conductor of the anode cation;
5) be electrically insulating;
6) not become readily oxidized during cell recharge; and
7) not react chemically with the cell housing or sealing materials.

In some embodiments the electrolyte salt comprises an anion selected from a halide anion, a carbonate anion, a sulfate anion, a phosphate anion, an oxide anion, a sulfide anion, or any combination thereof; and a cation selected from an alkali metal cation, an alkaline earth metal cation, a rare earth metal cation, an actinide cation, a Sc cation, a Ti cation, a V cation, a W cation, a Mn cation, an Fe cation, a Co cation, an Al cation, an organic cation, or any combination thereof.

In other embodiments, the anion is a halide anion.

In a further specific embodiment, the anion is a chloride anion.

In a specific embodiment, the cation is an alkali metal cation.

In a further specific embodiment, the cation is a sodium cation, a potassium cation, or any combination thereof.

In another specific embodiment the cation is an aluminum cation.

In a further specific embodiment the electrolyte salt comprises an aluminum halide.

In an even further specific embodiment, the aluminum halide comprises aluminum chloride.

In some embodiments, the electrolyte salt is a salt of formula $AlX_3$, wherein X is a halide ion.

In some embodiments, the electrolyte salt comprises an alkali metal halide or an alkaline earth metal halide.

In some specific embodiments, the electrolyte salt comprises NaF, KF, CaF, LiF, KCl, NaCl, $CaF_2$, or $BaF_2$, or any combination thereof. For example, the electrolyte salt comprises NaF, $AlF_3$, $CaF_2$, and $BaF_2$.

In some embodiments, the electrolyte salt comprises an alkali metal-aluminum halide.

In some specific embodiments, the electrolyte salt comprises $LiAlCl_4$, $LiAlBr_4$, $NaAlBr_4$, $KAlCl_4$ or $Na_3AlF_6$, or any combination thereof.

In some embodiments, the electrolyte salt comprises aluminum oxide, vanadium oxide, tungsten oxide, calcium carbonate, potassium-calcium carbonate, or sodium-calcium carbonate.

In some specific embodiments, the electrolyte salt comprises $Al_2O_3$ or $V_2O_5$.

In some embodiments, the electrolyte salt comprises $Na_2S$, $FeS_2$, or $CoS_2$.

In some embodiments, the electrolyte salt comprises a bulk material comprising a single cation species and a single anion species.

In a further embodiment, the electrochemical cell comprises a second electrolyte salt, wherein the second electrolyte salt comprises an anion and a cation, and the anion is selected from a halide anion, a carbonate anion, a sulfate anion, a phosphate anion, an oxide anion, a sulfide anion, or any combination thereof; and the cation is selected from an alkali metal cation, an alkaline earth metal cation, a rare earth metal cation, an actinide cation, a Sc cation, a Ti cation, a V cation, a W cation, a Mn cation, an Fe cation, a Co cation, an Al cation, an organic cation, or any combination thereof.

In some embodiments, the electrolyte salt comprises an aluminium halide, an alkali metal halide, an alkaline earth metal halide, an alkali metal-aluminum halide, an aluminum oxide, a vanadium oxide, a tungsten oxide, a sodium sulfide, an iron sulfide, a cobalt sulfide, an imidazolium halide, a butyl pyridinium halide, a calcium carbonate, a potassium-calcium carbonate, a sodium-calcium carbonate, or any combination thereof.

In some embodiments, the electrolyte salt comprises a binary melt material or a ternary melt material.

In some specific embodiments, the electrolyte salt comprises a binary melt material comprising aluminum halide and an alkali metal halide.

In a specific embodiment, the binary melt material comprises $AlCl_3$ and KCl.

In another specific embodiment, the binary melt material comprises $AlCl_3$ and NaCl.

In some specific embodiments the electrolyte salt comprises a ternary melt material comprising aluminum halide, a first alkali metal halide, and a second alkali metal halide.

In one specific embodiment, the ternary melt material comprises $AlCl_3$, KCl, and NaCl.

In some embodiments, the electrolyte salt comprises NaF, $AlF_3$, $CaF_2$, and $BaF_2$, or any combination thereof formalized to insure that the density of the molten salt is greater than that of the molten aluminum or molten aluminum alloy.

In a more specific embodiment, the electrolyte salt comprises from about 10 to about 20 wt % of NaF, from about 40 to about 60 wt % of $AlF_3$, from about 10 to about 20 wt % of $CaF_2$, and from about 10 to about 20 wt % of $BaF_2$.

In one specific embodiment, the electrolyte salt comprises about 18 wt % of NaF, about 48 wt % of $AlF_3$, about 16 wt % of $CaF_2$, and about 18 wt % of $BaF_2$.

In a preferred embodiment, the anion of the electrolyte salt is not substantially oxidized when the electrochemical cell recharges.

D. Materials of Construction

Materials useful for the construction of the cell walls may be electrically non-conductive, thermally insulating, and resistant to attack by molten aluminum and molten salts at operating temperatures of the cell. Suitable materials may include alumina and mixtures of alumina with calcium aluminate cements.

In some embodiments, the electrochemical cell comprises a housing that contains the molten anode, the cathode, and the electrolyte salt, wherein a portion of the housing contacts the molten anode, and the portion of the housing that contacts the molten anode comprises an electrically conductive material.

In another embodiment, the portion of the housing in contact with the molten anode does not substantially react with the molten anode.

In some embodiments, the portion of the housing that contacts the molten anode comprises graphite.

In some embodiments, the housing further comprises boron carbide, aluminum boride, zirconium dioxide, or any combination thereof.

The housing may comprise an airtight chamber or a chamber that is permeable or open to air.

III. CELL STACKS AND BATTERIES

Another aspect of the present invention provides a rechargeable battery comprising a plurality of electrochemical cells which are electrically connected, wherein each electrochemical cell comprises a molten anode, a cathode, and a molten, non-aqueous electrolyte salt, wherein the molten anode comprises elemental aluminum or an aluminum alloy.

In a further embodiment, the battery comprises a heater that thermally communicates with the molten anode, the cathode, the molten electrolyte salt, or any combination thereof.

In a specific embodiment, the heater burns a combustible fuel or fluid (e.g., natural gas, propane, methane, syn gas, diesel fuel, gasoline, kerosene, any combination thereof, or the like) when the heater is operating.

In some embodiments, the plurality of electrochemical cells are electrically connected in the absence of a hermetic seal.

In some embodiments, the plurality of electrochemical cells are stacked in a bipolar configuration. Bipolar configurations have the advantages of lower battery weight, increased effective gravimetric energy density, reduced battery assembly and materials costs, lower effective resistance, minimized IR losses between adjacent cells, and more uniform current/potential distributions across surface area of active materials in each cell. Cells in a bipolar configuration can handle higher power resulting in greater overall battery energy density and can be assembled in higher voltage configurations (e.g. 24, 48, 60V).

IV. METHODS OF MANUFACTURING AN ELECTROCHEMICAL CELL

The present invention also provides a process for manufacturing a rechargeable electrochemical cell comprising heating an anode material to a molten state, wherein the molten anode material comprises an aluminum material, providing a cathode material, and providing a non-aqueous electrolyte salt between the anode material and the cathode material, wherein the molten anode material has a density that is less than the density of the cathode material.

In one embodiment, the high density cathode material may be heated to its melting point to form a molten liquid. The molten liquid metal may then be flowed into a housing to form a first layer in the housing. An intermediate density electrolyte salt may be heated to its melting point to form a molten liquid electrolyte salt. The electrolyte salt may then be flowed into the housing and form a second layer in the housing. A low density anode material may be heated to its melting point to form a molten liquid and flowed into the housing to form a third layer in the housing. The difference in the densities of the anode material, the electrolyte salt, and the cathode material will result in the three molten layers remaining separate with the electrolyte salt positioned between the molten anode and molten cathode layers.

In an alternative embodiment, the anode material, the electrolyte salt, and the cathode material are stacked in order of decreasing density, i.e., the less dense material is situated on the top of the stack, within a cell housing and heated to a temperature wherein at least the anode material becomes molten. In some of these embodiments, the anode material, the electrolyte salt, and the cathode material are heated to a temperature wherein each of the anode material, the electrolyte salt, and the cathode material are molten. In these specific embodiments, the molten anode material, molten electrolyte salt, and the molten cathode material form three distinct, non-miscible layers.

V. EXAMPLES

Example 1: Bi—Sn Cathode Cells

Five cells according to the present invention were formed using a Kerr Auto Electro-Melt furnace that was modified to include two holes in the cover to allow for the insertion of current collectors into the anode and cathode. The Kerr Auto Electro-Melt furnace included a graphite crucible placed on the inside of the furnace. Within the graphite crucible, an alumina crucible (33 mm outer diameter, 25 mm inner diameter, 105 mm length—McDanel Ceramics) was placed. The materials used for the molten metal battery were placed inside of the alumina crucible. 10 g of the cathode material (50/50 weight mixture of bismuth and tin granules (1-2 mm)) was first placed in the alumina crucible. 15 g of the electrolyte (a powder combination of 18% wt NaF, 48% wt $AlF_3$, 16% wt $CaF_2$, and 18% wt $BaF_2$ that has already been mixed, heated to melting in alumina crucible using a muffle furnace at 900° C., then allowed to cool and solidify) was then placed in the alumina crucible. Then, 10 g of the anode material (aluminum granules, 8-12 mm in size) was placed in the alumina crucible. The powders for the electrolyte and the anode material are commercially available from Alfa Aesar.

The Kerr Auto Electro-Melt furnace was covered and the temperature was raised to 815° C.

The cathode current collector, a molybdenum rod (5 mm diameter) was inserted into an alumina tube with an inner diameter of 5 mm and an outer diameter of 8 mm such that 3 mm of the molybdenum rod was exposed from the end of the alumina tube. The alumina tube was used to electrically insulate the molybdenum from the cathode and the electrolyte. Once the furnace reached temperature, the molybdenum rod assembly was inserted in one of the two holes in the furnace cover and placed such that the bottom of the rod was touching the bottom of the alumina crucible and the exposed molybdenum is surrounded by the molten metal cathode. The anode current collector, a graphite rod (5 mm diameter) was inserted in the second of the two holes in the furnace cover and placed such that the rod is only in the molten aluminum portion of the molten metal battery. Both the molybdenum and graphite current collectors are commercially available from Alfa Aesar.

The cyclic voltammetry (CV) scans, provided in FIGS. 3-7 as I vs. E plots, were performed using a Parstat 2273 potentiostat (Princeton Applied Research).

Figure 3:
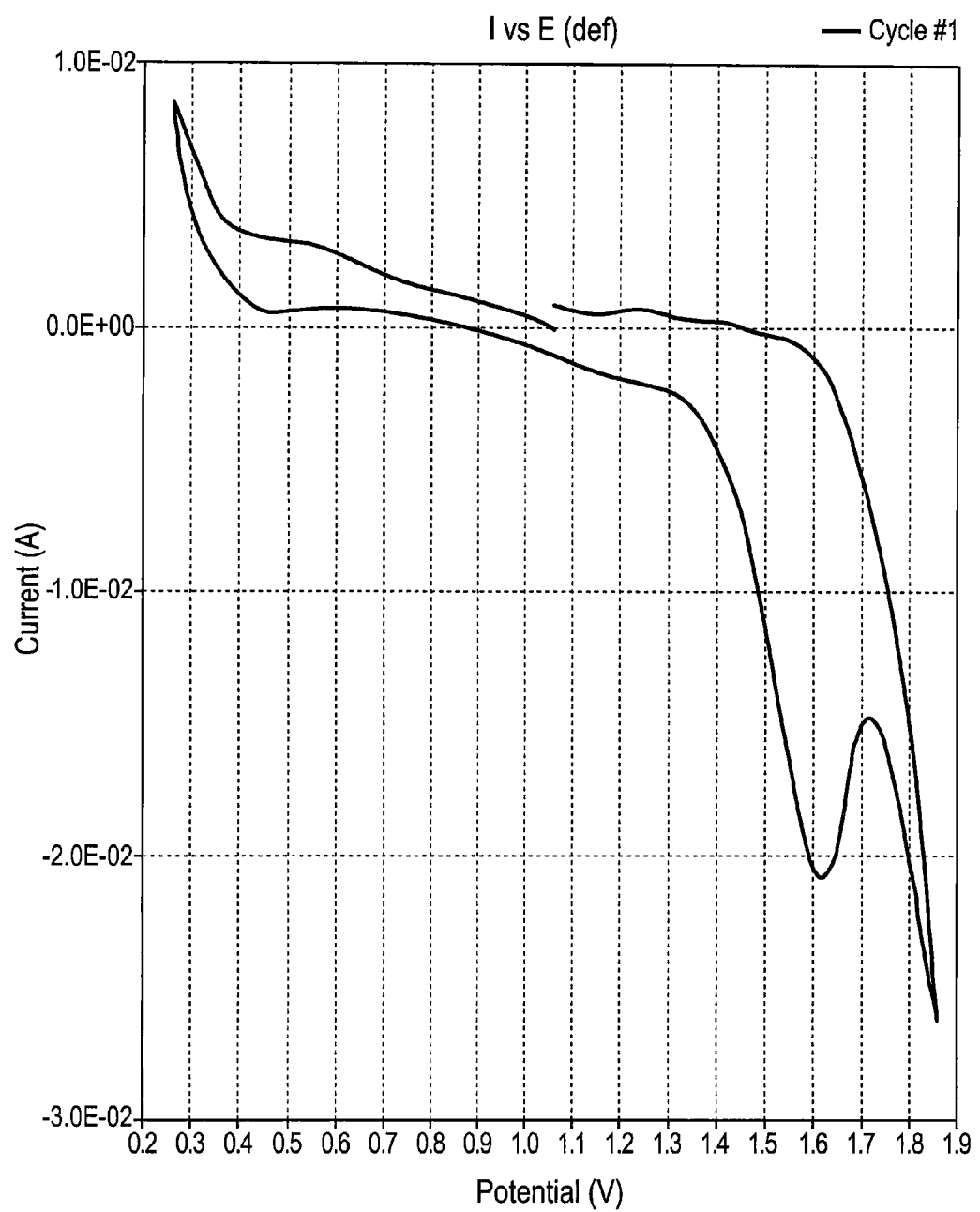
FIGS. 3-7 are plots of current (I) vs. energy (E) that were generated by CV scans of example cells of the present invention described in Example 1.

In the CV scan, i.e., the I vs. E plot, depicted in FIG. 3; the following settings were used:
Scan Definition:
 Initial Potential: 0.0000 V vs open circuit
 Vertex Potential: −0.8000 V vs open circuit
 Vertex Potential: 0.8000 V vs open circuit
 Final Potential: 0.0000 V vs open circuit
 Scan rate: 50.00000 mV/s
PreScan Definition:
 Open circuit: 1.060 V (Measured)

Figure 4:
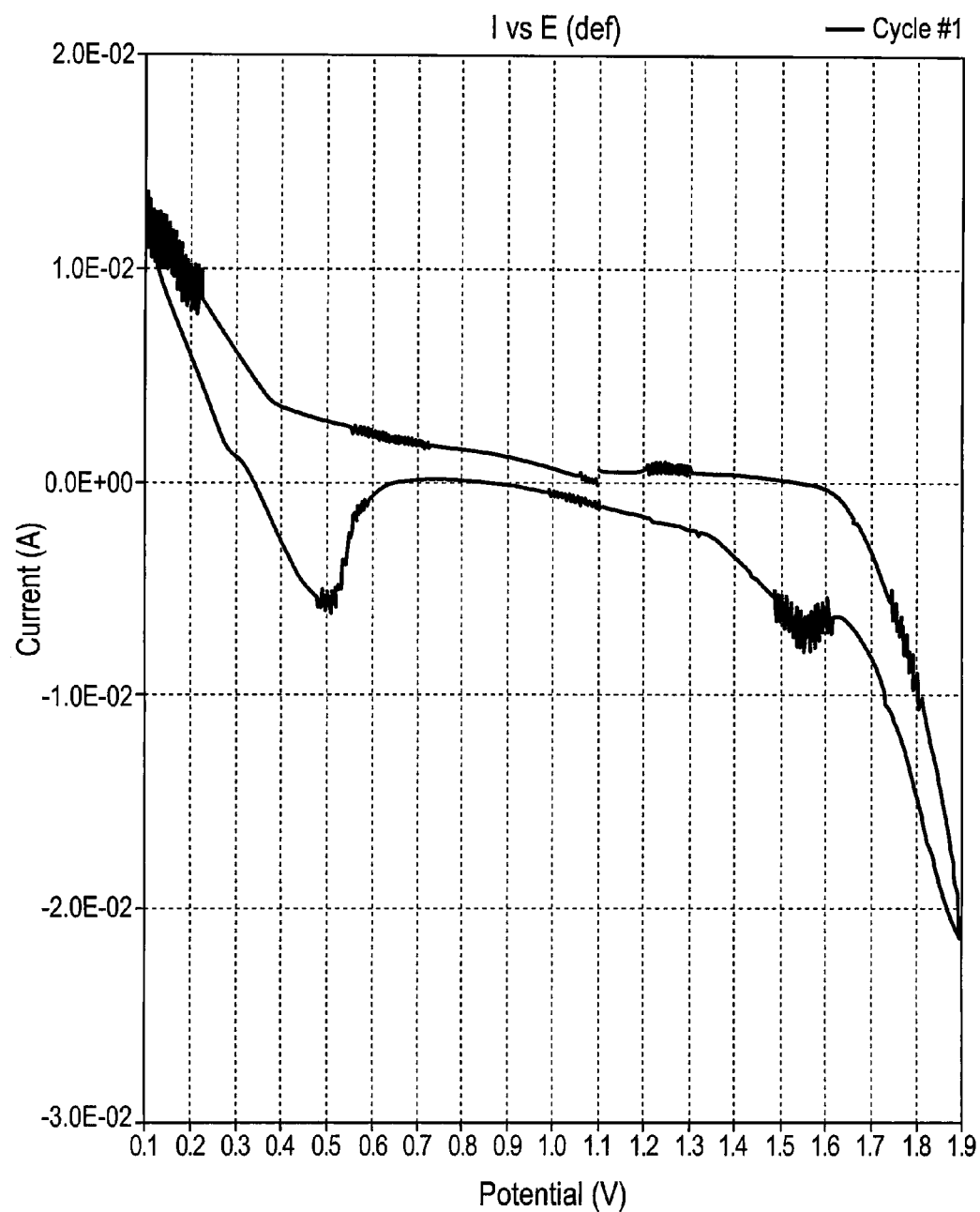

In the CV scan, i.e., the I vs. E plot, depicted in FIG. 4; the following settings were used:
Scan Definition:
 Initial Potential: 1.1000 V vs ref
 Vertex Potential: 0.1000 V vs ref
 Vertex Potential: 1.9000 V vs ref
 Scan rate: 50.00000 mV/s
 Cycles: 3
PreScan Definition:
 Open circuit: 1.098 V (Measured)

Figure 5:
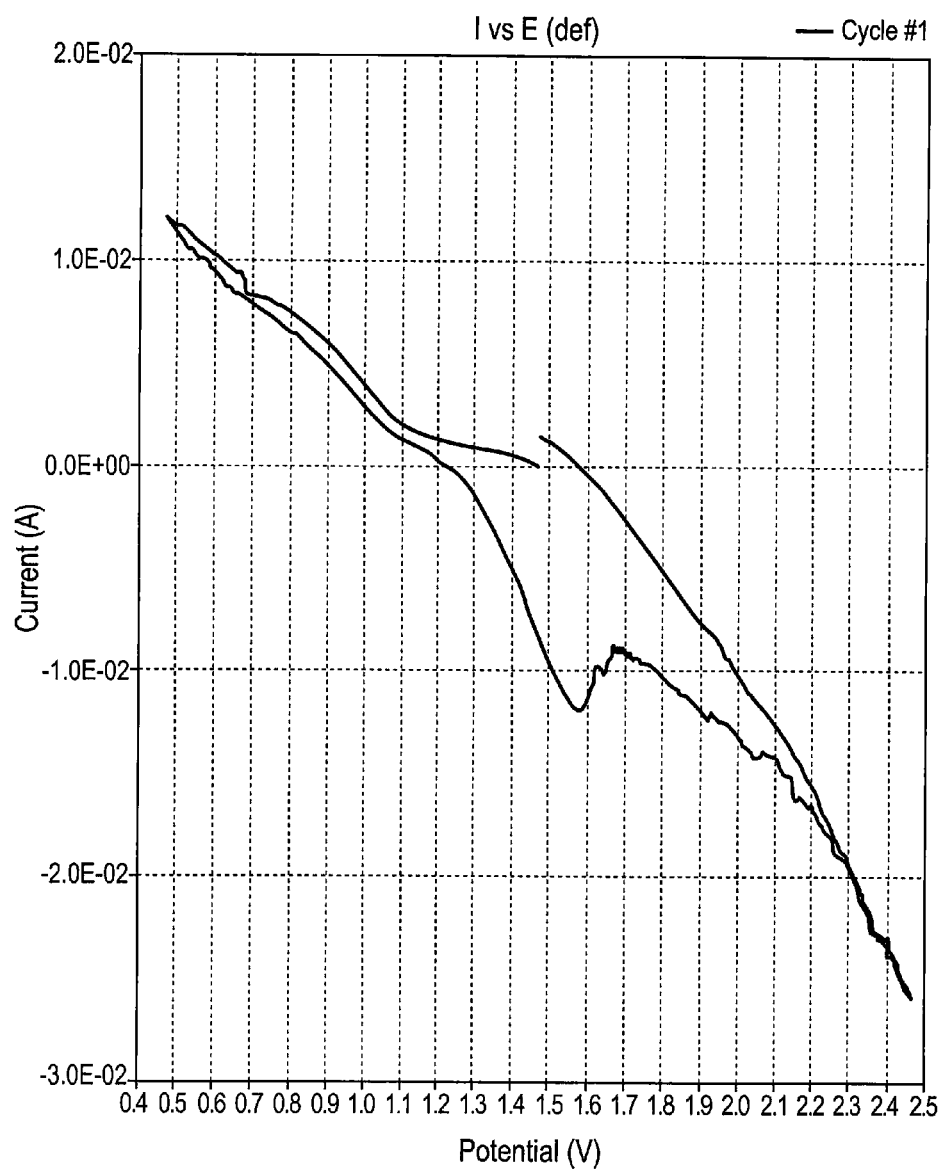
Figure 6:
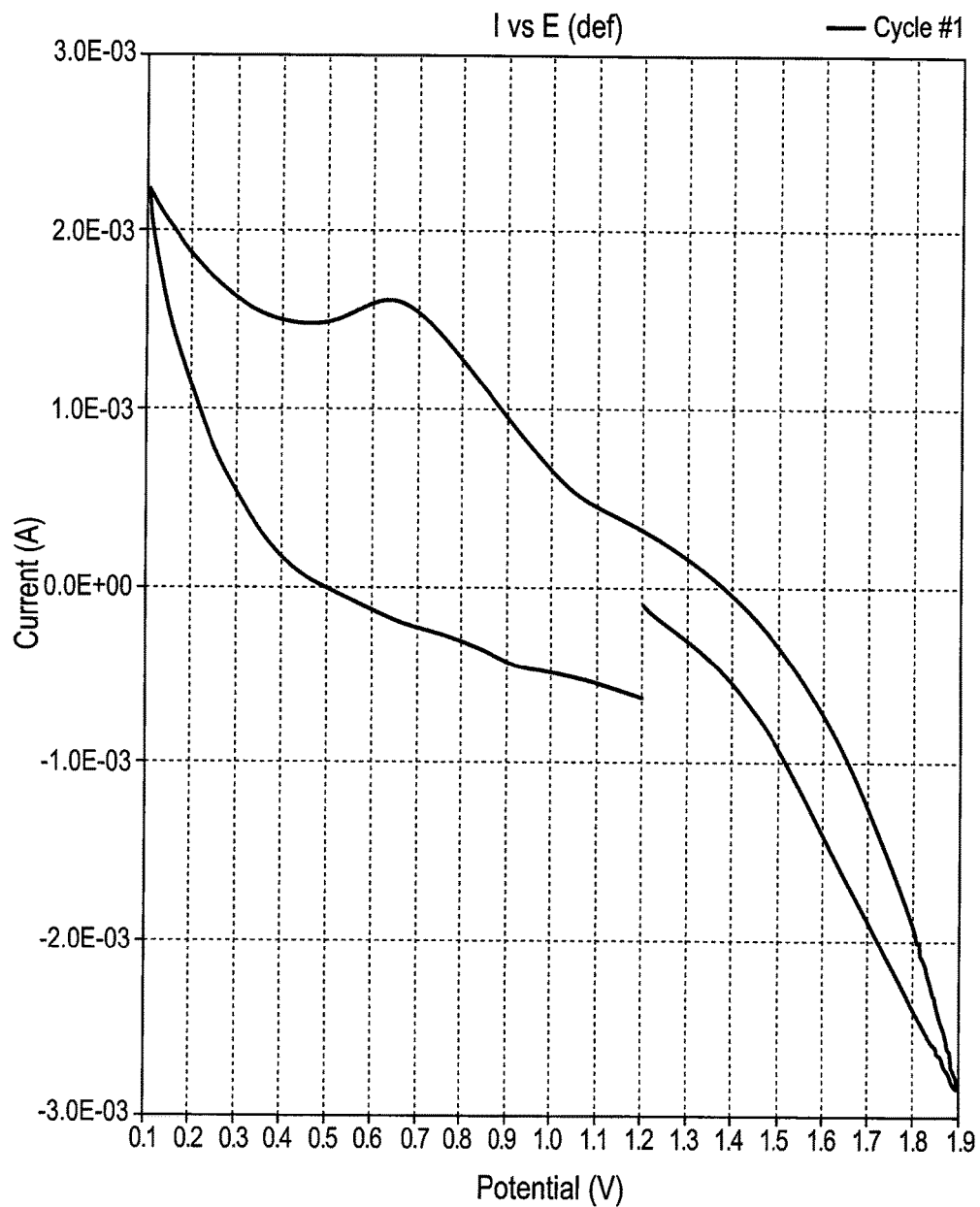
Figure 7:
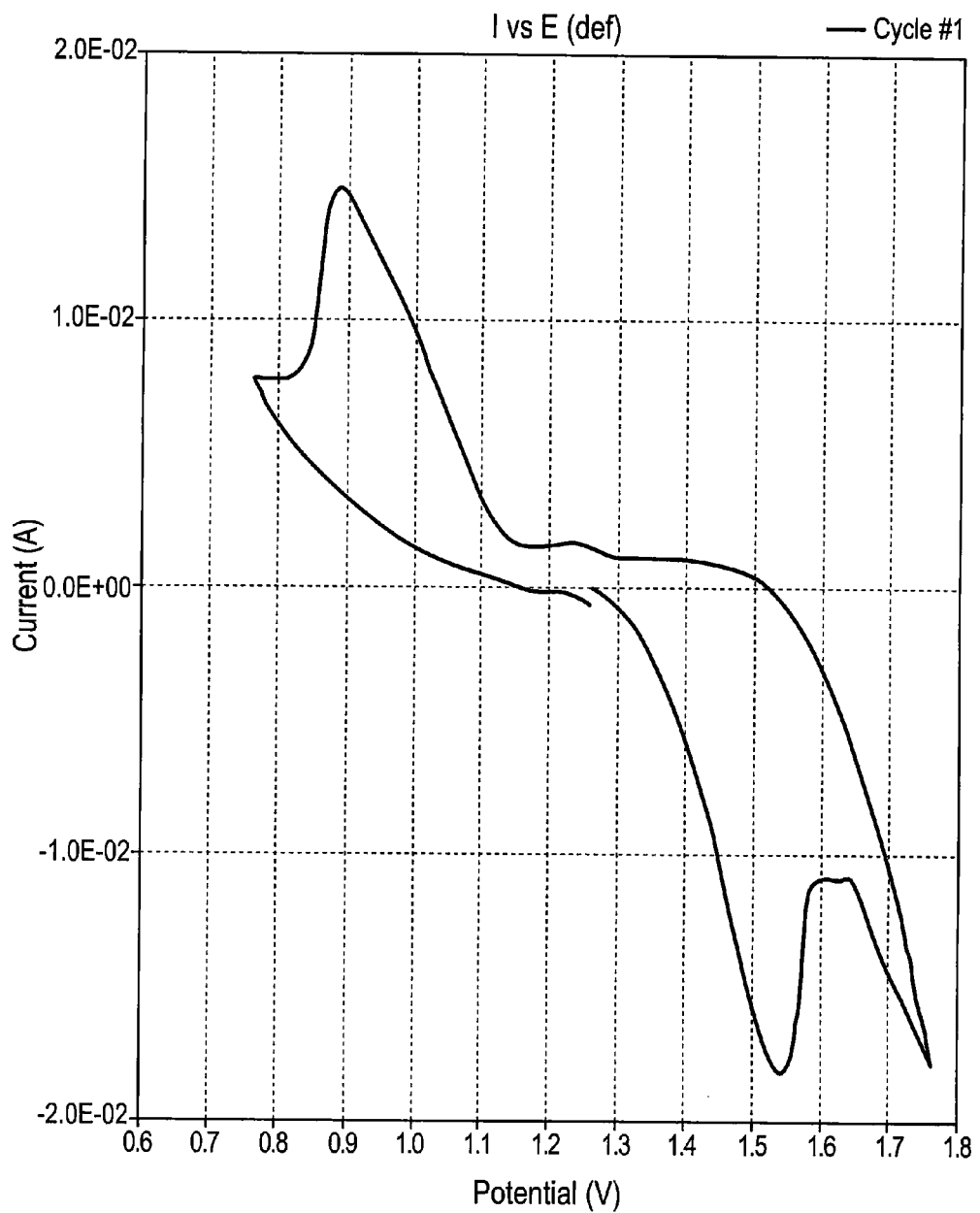
Figure 8:
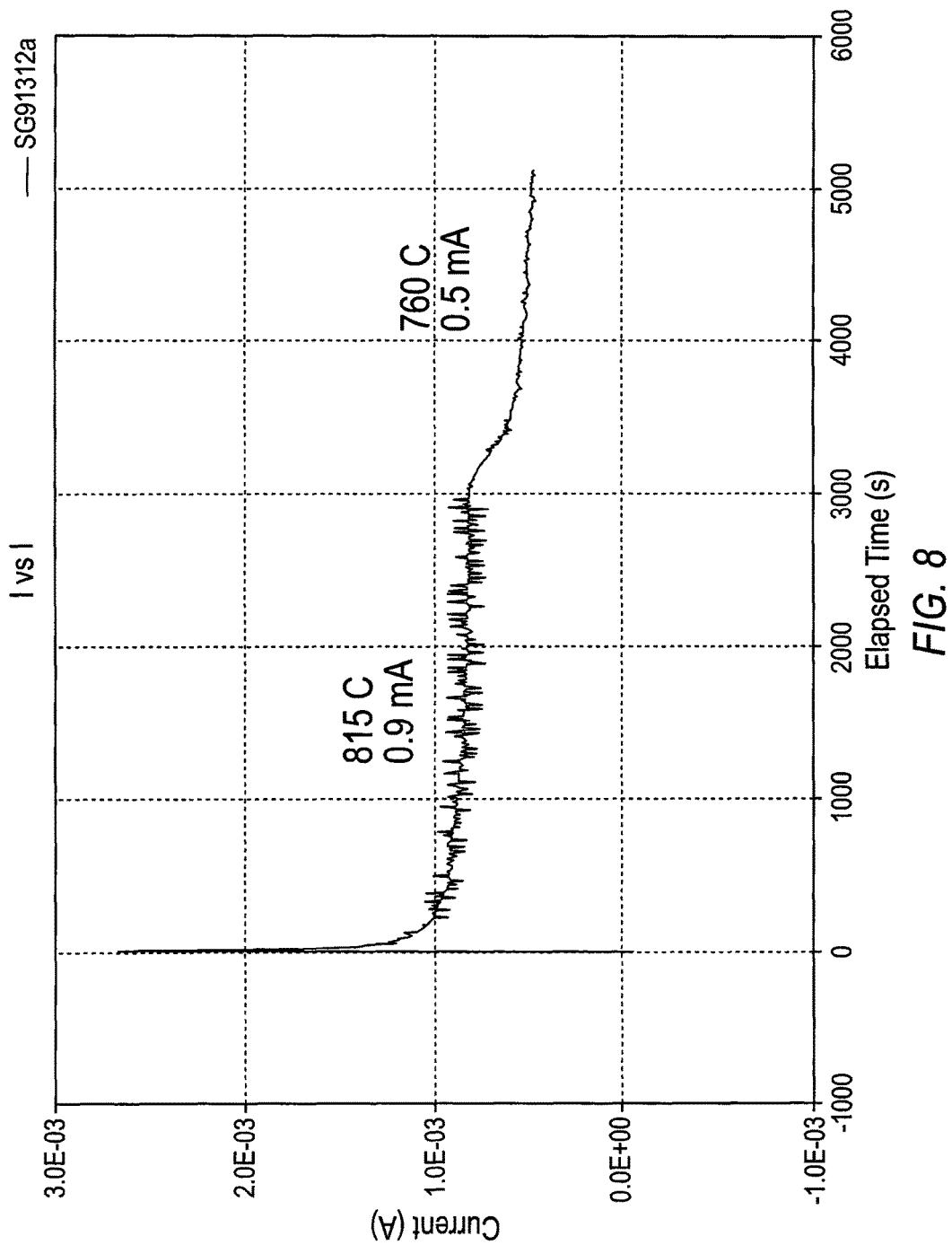
FIG. 8 is a plot of current (I) vs. time (E) at cell operating temperatures of 815° C. and 760° C. for an example cell of the present invention described in Example 1 that was discharged at 0.25 V.

In the CV scan, i.e., the I vs. E plot, depicted in FIG. 5; the following settings were used:
Scan Definition:
 Initial Potential: 0.0000 V vs open circuit
 Vertex Potential: −1.0000 V vs open circuit
 Vertex Potential: 1.0000 V vs open circuit
 Final Potential: 0.0000 V vs open circuit
 Scan rate: 50.00000 mV/s
PreScan Definition:
 Open circuit: 1.469 V (Measured)
 Equilibration Time: 15 sec In the CV scan, i.e., the I vs. E plot, depicted in FIG. 6; the following settings were used:
Scan Definition:
 Initial Potential: 1.2000 V vs ref
 Vertex Potential: 1.9000 V vs ref
 Vertex Potential: 0.1000 V vs ref
 Final Potential: 1.2000 V vs ref
 Scan rate: 50.00000 mV/s
PreScan Definition:
 Open circuit: 1.084 V (Measured)
 Equilibration Time: 15 sec In the CV scan, i.e., the I vs. E plot, depicted in FIG. 7; the following settings were used:
Scan Definition:
 Initial Potential: 0.0000 V vs open circuit
 Vertex Potential: 0.5000 V vs open circuit
 Vertex Potential: −0.5000 V vs open circuit
 Final Potential: 0.0000 V vs open circuit
 Scan rate: 50.00000 mV/s
PreScan Definition:
 Open circuit: 1.263 V (Measured)
 Equilibration Time: 15 sec Referring to FIG. 8, an example cell, constructed as described above, was discharged at a voltage of 0.25 V at a cell operating temperature of 815° C. and 760° C.

Example 2: Tungsten Cathode Cell

An example cell of the present invention was constructed according to the procedures described in Example 1, using 10 g of tungsten oxide ($WO_3$) for the cathode material.

Figure 9:
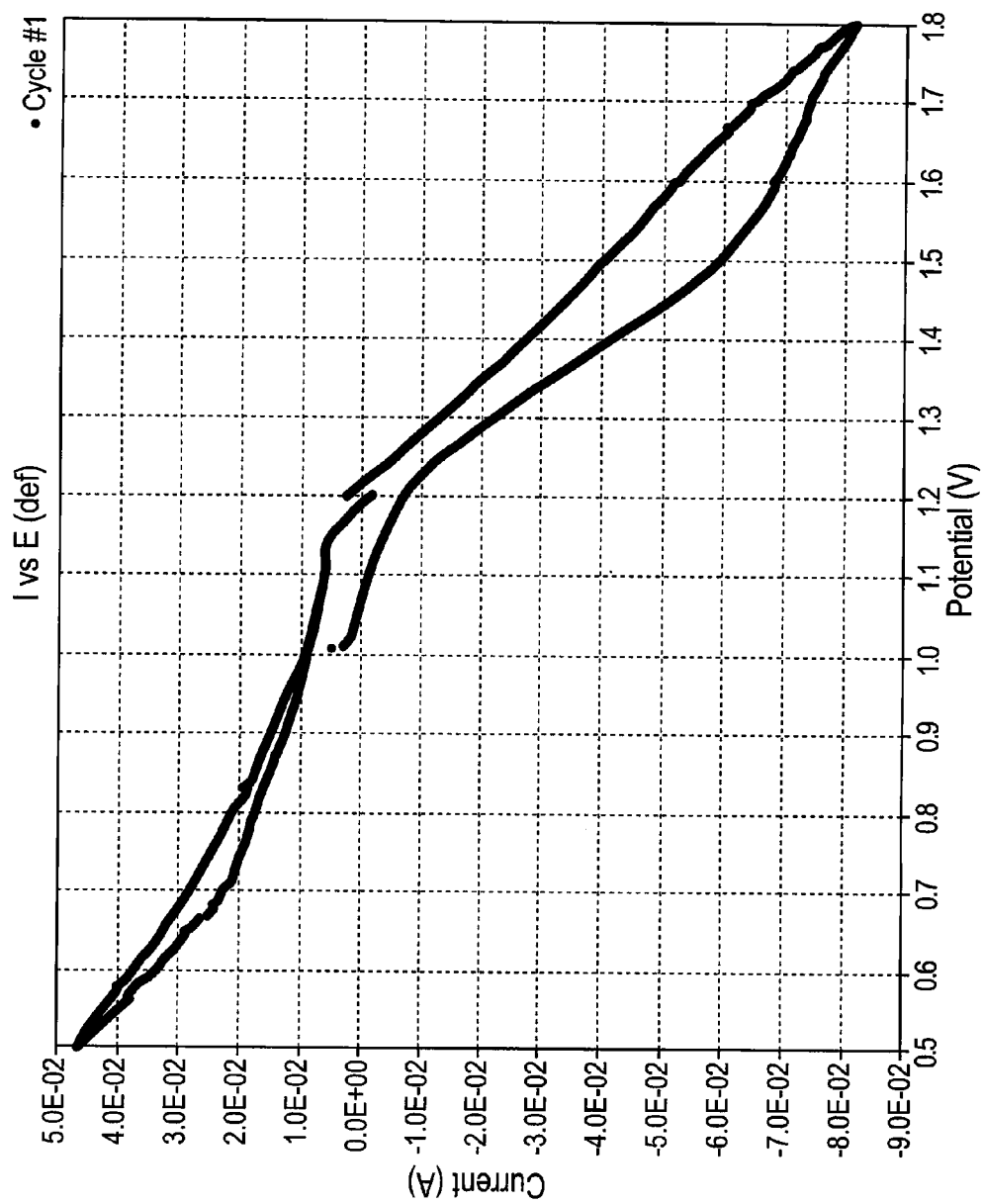
FIG. 9 is a plot of current (I) vs. energy (E) that was generated by the CV scan described in the Example 2.

In the CV scan, i.e., the I vs. E plot, depicted in FIG. 9, the scan potentials ranged from 0.5 V (discharge voltage) to 1.8 V. This cell generated peak discharge currents at 0.5 V that were >9 $mA/cm^2$.

OTHER EMBODIMENTS

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely example embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A rechargeable electrochemical cell comprising:
 a molten anode;
 a cathode;
 a non-aqueous electrolyte salt; and
 a housing that contains the molten anode, the cathode, and the electrolyte salt,
 wherein the housing is permeable to air, wherein the electrolyte salt is situated between the molten anode and the cathode during the operation of the electrochemical cell, and wherein the molten anode comprises an aluminum material.

2. The electrochemical cell of claim 1, wherein
 the molten anode has a density that is less than the density of the cathode and less than the density of the electrolyte salt; and
 the cathode has a density that is greater than the molten anode and greater than the electrolyte salt.

3. The electrochemical cell of claim 1, wherein the aluminum material comprises elemental aluminum or an aluminum alloy.

4. The electrochemical cell of claim 1, wherein the electrochemical cell has an operating temperature of greater than about 500° C.

5. The electrochemical cell of claim 1, wherein the electrochemical cell has an operating temperature of about 800° C. or greater.

6. The electrochemical cell of claim 1, wherein the aluminum material comprises an aluminum alloy, and the aluminum alloy comprises aluminum alloyed with iron, silicon, gallium, bismuth, cadmium, scandium, indium, lead, mercury, thallium, tin, zinc, lithium, magnesium, antimony, copper, manganese, nickel, chromium, vanadium, titanium, zirconium, or any combination thereof.

7. The electrochemical cell of claim 6, wherein the aluminum alloy comprises aluminum alloyed with a eutectic amount of iron, silicon, gallium, bismuth, cadmium, scandium, indium, lead, mercury, thallium, tin, zinc, lithium, magnesium, antimony, copper, manganese, nickel, chromium, vanadium, titanium, zirconium, or any combination thereof.

8. The electrochemical cell of claim 3, wherein the aluminum alloy comprises from about 0.01 to about 50 wt % of a non-aluminum alloying material.

9. The electrochemical cell of claim 1, wherein the cathode comprises a cathode material comprising an elemental metal, metal alloy, metal oxide, metal sulfide, or doped material.

10. The electrochemical cell of claim 9, wherein the cathode material has a melting temperature that is less than or equal to the melting temperature of the anode.

11. The electrochemical cell of claim 9, wherein the cathode material has a melting temperature that is greater than or equal to the melting temperature of the anode.

12. The electrochemical cell of claim 9, wherein the cathode material is molten during the operation of the electrochemical cell.

13. The electrochemical cell of claim 9, wherein the cathode material comprises iron, copper, chromium, vanadium, titanium, bismuth, gallium, lead, zirconium, magnesium, manganese, silicon, antimony, tin, zinc, or any combination thereof.

14. The electrochemical cell of claim 9, wherein the cathode material is substantially solid during the operation of the electrochemical cell.

15. The electrochemical cell of claim 9, wherein the cathode material comprises one or more metal sulfides.

16. The electrochemical cell of claim 9, wherein the cathode material comprises manganese oxide, vanadium oxide, titanium aluminum tetrachloride, manganese chlorine aluminum tetrachloride, cobalt aluminum tetrachloride, or any combination thereof.

17. The electrochemical cell of claim 9, wherein the cathode material is capable of forming an alloy with the molten anode when cathode material is also in a molten state.

18. The electrochemical cell of claim 1, wherein the electrolyte salt comprises:
an anion selected from a halide anion, a carbonate anion, a sulfate anion, a phosphate anion, an oxide anion, a sulfide anion, or any combination thereof; and
a cation selected from an alkali metal cation, an alkaline earth metal cation, a rare earth metal cation, an actinide cation, a Sc cation, a Ti cation, a V cation, a W cation, a Mn cation, an Fe cation, a Co cation, an Al cation, an organic cation, or any combination thereof.

19. The electrochemical cell of claim 1, wherein the electrolyte salt comprises an alkali metal-aluminum halide.

20. The electrochemical cell of claim 19, wherein the electrolyte salt comprises $LiAlCl_4$, $LiAlBr_4$, $NaAlBr_4$, $KAlCl_4$, $Na_3AlF_6$, or any combination thereof.

21. The electrochemical cell of claim 1, further comprising a second electrolyte salt, wherein the second electrolyte salt comprises an anion and a cation, and
the anion is selected from a halide anion, a carbonate anion, a sulfate anion, a phosphate anion, an oxide anion, a sulfide anion, or any combination thereof; and
the cation is selected from an alkali metal cation, an alkaline earth metal cation, a rare earth metal cation, an actinide cation, a Sc cation, a Ti cation, a V cation, a W cation, a Mn cation, an Fe cation, a Co cation, an Al cation, an organic cation, or any combination thereof.

22. The electrochemical cell of claim 21, wherein the electrolyte salt comprises a binary melt material or a ternary melt material.

23. The electrochemical cell of claim 22, wherein the electrolyte salt comprises a binary melt material comprising aluminum halide and an alkali metal halide.

24. The electrochemical cell of claim 23, wherein the binary melt material comprises $AlCl_3$ and KCl, or the binary melt material comprises $AlCl_3$ and NaCl.

25. The electrochemical cell of claim 21, wherein the electrolyte salt comprises a ternary melt material comprising aluminum halide, a first alkali metal halide, and a second alkali metal halide.

26. The electrochemical cell of claim 25, wherein the ternary melt material comprises $AlCl_3$, KCl, and NaCl.

27. The electrochemical cell of claim 1, wherein the electrolyte salt comprises NaF, $AlF_3$, $CaF_2$, and $BaF_2$.

28. The electrochemical cell of claim 27, wherein the electrolyte salt comprises from about 10 wt % to about 20 wt % of NaF, from about 40 wt % to about 60 wt % of $AlF_3$, from about 10 to about 20 wt % of $CaF_2$, and from about 10 to about 20 wt % of $BaF_2$.

29. The electrochemical cell of claim 1, wherein a portion of the housing contacts the molten anode, and the portion of the housing that contacts the molten anode comprises an electrically conductive material.

30. The electrochemical cell of claim 29, wherein the portion of the housing that contacts the molten anode comprises graphite.

31. The electrochemical cell of claim 29, wherein the housing further comprises boron carbide, aluminum boride, zirconium dioxide, or any combination thereof.

32. The electrochemical cell of claim 1, wherein the cathode comprises a bismuth material, and the bismuth material comprises bismuth and tin.

33. The electrochemical cell of claim 1, wherein the cathode comprises a tungsten material, and the tungsten material comprises $WO_3$.

34. The electrochemical cell of claim 1, further comprising an anode current collector comprising molybdenum.

35. The electrochemical cell of claim 1, further comprising a cathode current collector comprising graphite.

36. The electrochemical cell of claim 1, further comprising a heater that thermally communicates with the cathode, the molten anode, the electrolyte salt, or any combination thereof.

* * * * *